United States Patent [19]

Clausen et al.

[11] Patent Number: 5,409,108
[45] Date of Patent: Apr. 25, 1995

[54] CARTRIDGE/CASSETTE STORAGE APPARATUS

[75] Inventors: Eivind Clausen, Bellingham, Wash.; Oliver Hood, Ballsbridge Dublin, Ireland

[73] Assignee: Allsop, Inc., Bellingham, Wash.

[21] Appl. No.: 50,086

[22] PCT Filed: Oct. 22, 1991

[86] PCT No.: PCT/US91/07921

§ 371 Date: Apr. 28, 1993

§ 102(e) Date: Apr. 28, 1993

[87] PCT Pub. No.: WO92/07777

PCT Pub. Date: May 14, 1992

[30] Foreign Application Priority Data

Oct. 31, 1990 [IE] Ireland .................. 3935/90

[51] Int. Cl.$^6$ .......................................... B65D 85/00
[52] U.S. Cl. .................. 206/309; 206/308.1; 206/387.1; 312/9.58; 312/9.63
[58] Field of Search ............. 206/307, 309, 310, 311, 206/312, 313, 444; 211/40, 41, 46; 312/9.63, 9.64, 9.9, 9.58, 9.59

[56] References Cited

U.S. PATENT DOCUMENTS

| | | | |
|---|---|---|---|
| 2,336,802 | 12/1943 | Posner | 129/16 |
| 2,810,388 | 10/1957 | Conley et al. | 129/16 |
| 3,811,745 | 5/1974 | Cylke | 312/13 |
| 3,969,007 | 7/1976 | Lowry . | |
| 4,203,519 | 5/1980 | Fujitaki . | |
| 4,239,109 | 12/1980 | Nielsen et al. | 206/387 |
| 4,262,808 | 4/1981 | Laporte | 211/46 |
| 4,549,775 | 10/1985 | Carter . | |
| 4,609,231 | 9/1986 | Neuman | 312/15 |
| 4,630,732 | 12/1986 | Snyman | 206/309 X |
| 4,819,802 | 4/1989 | Gutierrez . | |
| 4,858,764 | 8/1989 | Domokos | 206/449 |
| 5,027,950 | 7/1991 | Gutierrez et al. | 206/312 X |
| 5,050,734 | 9/1991 | Chen | 206/444 |

FOREIGN PATENT DOCUMENTS 614547 11/1979 Switzerland .
2194510 3/1988 United Kingdom .

*Primary Examiner*—Jacob K. Ackun
*Attorney, Agent, or Firm*—Christensen, O'Connor, Johnson & Kindness

[57] ABSTRACT

A storage apparatus for holding containers such as those in which compact discs or tape cassettes are stored. The storage device of this invention includes a bottom member, a top member that is spaced from the bottom member, and a pair of side walls used to couple the top member to the bottom member. A retaining member with a number of downwardly extending flexible fingers is attached to the bottom surface of the top member. The flexible fingers extend downward and are dimensioned so that the distance between the surface of the bottom member and the fingers is less than the height of the containers that the device is intended to store. The bottom member is formed with a main surface directed toward the rear of the device and is formed with small ribs and a smooth surface that slopes downwardly from the main surface toward the front edge of the device. The storage apparatus is dimensioned such that the front ends of the containers which it is designed to hold extend out in front of the apparatus. When a container is inserted in the storage device of this invention, the container is prevented from sliding by either adjacent containers and/or the edges of one or more of the adjacent fingers. The container is removed by pushing downward on the exposed outer corner of the container. This motion causes the container to pivot outward away from the device where it can then be grabbed and pulled away.

12 Claims, 7 Drawing Sheets

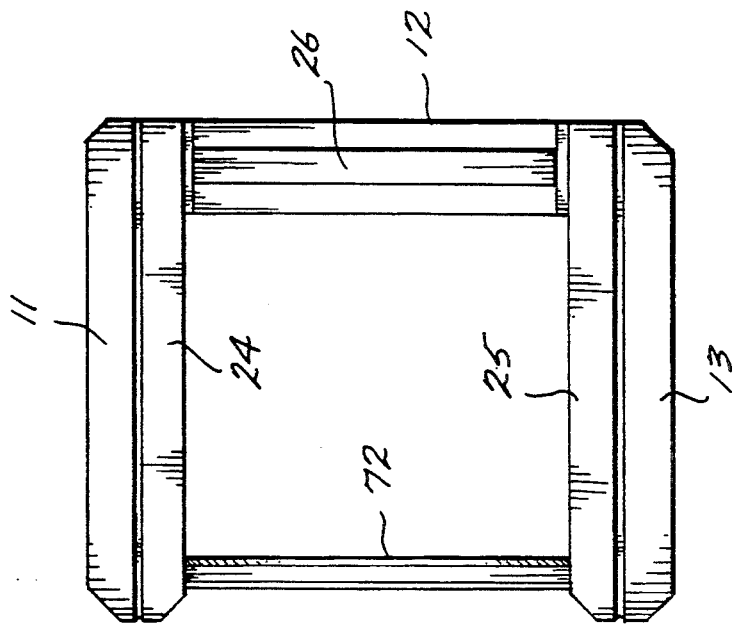
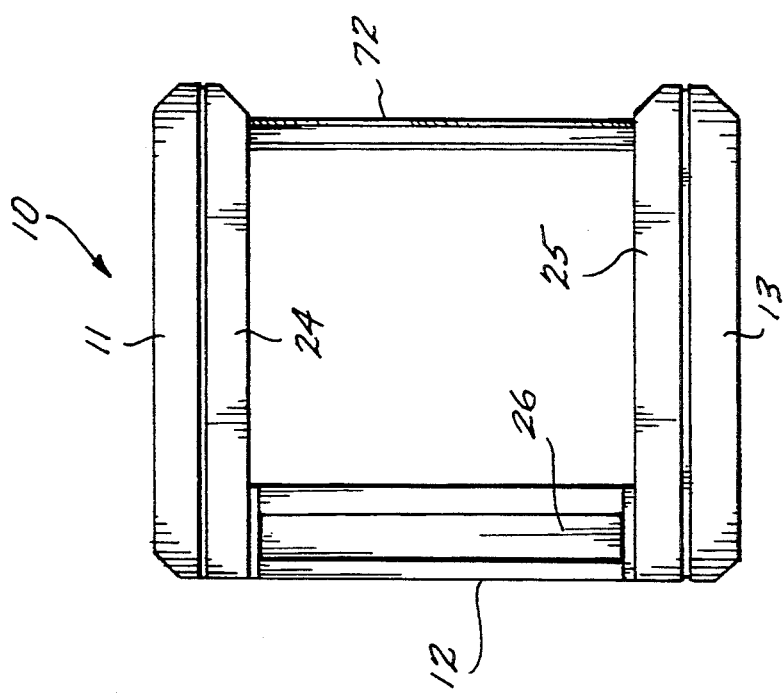

CARTRIDGE/CASSETTE STORAGE APPARATUS

FIELD OF THE INVENTION

This application is based on International Application No. PCT/US91/07921, filed Oct. 25, 1991.

The present invention relates to a storage apparatus for holding a set of rectangular cartridges or cassettes and in particular to a storage apparatus for storing compact discs or tape cassettes that are contained in storage boxes.

BACKGROUND OF THE INVENTION

There have been numerous storage devices developed for holding small rectangular objects like tape cassettes or compact discs that are contained in individual storage boxes. Many of these devices are formed with dividers that define individual compartments in which each storage box is held. A disadvantage of these devices is that space occupied by the dividers cannot contain a storage box. This reduces the capacity of these devices. Still another disadvantage of these systems is that the dividers restrict the lateral movement of the storage boxes held therein. This makes it impossible to move a set of the storage boxes laterally across the device so as to create a space for a third box between two already stored boxes. Consequently, a person wishing to so interleave the storage boxes must move each of the boxes individually in order to create the necessary opening.

SUMMARY OF THE INVENTION

This invention is directed to a storage device for containing boxes or the like so as to maximize the number of containers that can be stored, and that allows an individual to move two or more containers to different locations in the device in a single motion. A preferred embodiment of this invention is directed to a storage device that does not include any divider panels which the user must readjust and which can disrupt the appearance of the storage device.

The first preferred embodiment of this invention includes a base member, two spaced apart side walls and a top member that define a storage space. The device is dimensioned so that it is slightly narrower in depth than the storage containers it is intended to hold. A stop tab attached to the back of either the bottom or top member limits the rearward movement of the storage containers. The storage device of this embodiment of the invention includes a retaining member that is attached to the bottom surface of the top member. The retaining member has a number of fingers that extend front-to-rear side-by-side across the width of the device and that are normally biased, or disposed, downwards. The bottom member has a main surface that is positioned so that it is spaced away from the retaining member fingers a distance that is slightly less than the height of the containers the device is intended to store. The front surface of the storage device bottom member slopes downwards from the main surface toward the front edge of the device.

A storage container, such as a compact disc "jewel box," is held in this storage device by simply placing the box upright between the bottom member and the retaining member. The box will abut one of the retaining member fingers so as to deflect the finger upwards. Consequently, the box is held in an upright position between either adjoining boxes and/or one or both of the adjoining fully extended fingers. An individual removes a storage box from this storage device by simply pressing downward on the exposed top corner of the box. The box will pivot downwards and outwards onto the sloping front surface of the bottom member. The box can then be removed from the storage device by simply gripping the opposed corners of the box and pulling it away from the storage device.

The storage device of this invention holds containers in an upright position without the use of dividers. Since there are no dividers, the whole of the storage space can be used to hold containers. This maximizes the number of containers that can be held in the device. Moreover, the containers can be laterally shifted to a new location in the storage space be simply pulling two or more containers partially out of the storage apparatus and moving them, together, to the desired new location. The containers do not have to be moved one at a time when them is a desire to place a new container between two previously stored containers. Furthermore, the retaining fingers are concealed from view. Consequently they do not detract from the overall aesthetic appearance of the storage holder of this invention.

BRIEF DESCRIPTION OF THE DRAWINGS

The foregoing aspects and many of the attendant advantages of this invention will be more readily appreciated as the same become better understood by reference to the following detailed description, when taken in conjunction with the accompanying drawings, wherein:

FIG. 9 is a plan view of one side of the apparatus of FIG. 1;

FIG. 10 is a plan view of the opposed side of the apparatus of FIG. 1; and

DETAILED DESCRIPTION OF THE PREFERRED EMBODIMENT

Figure 1:
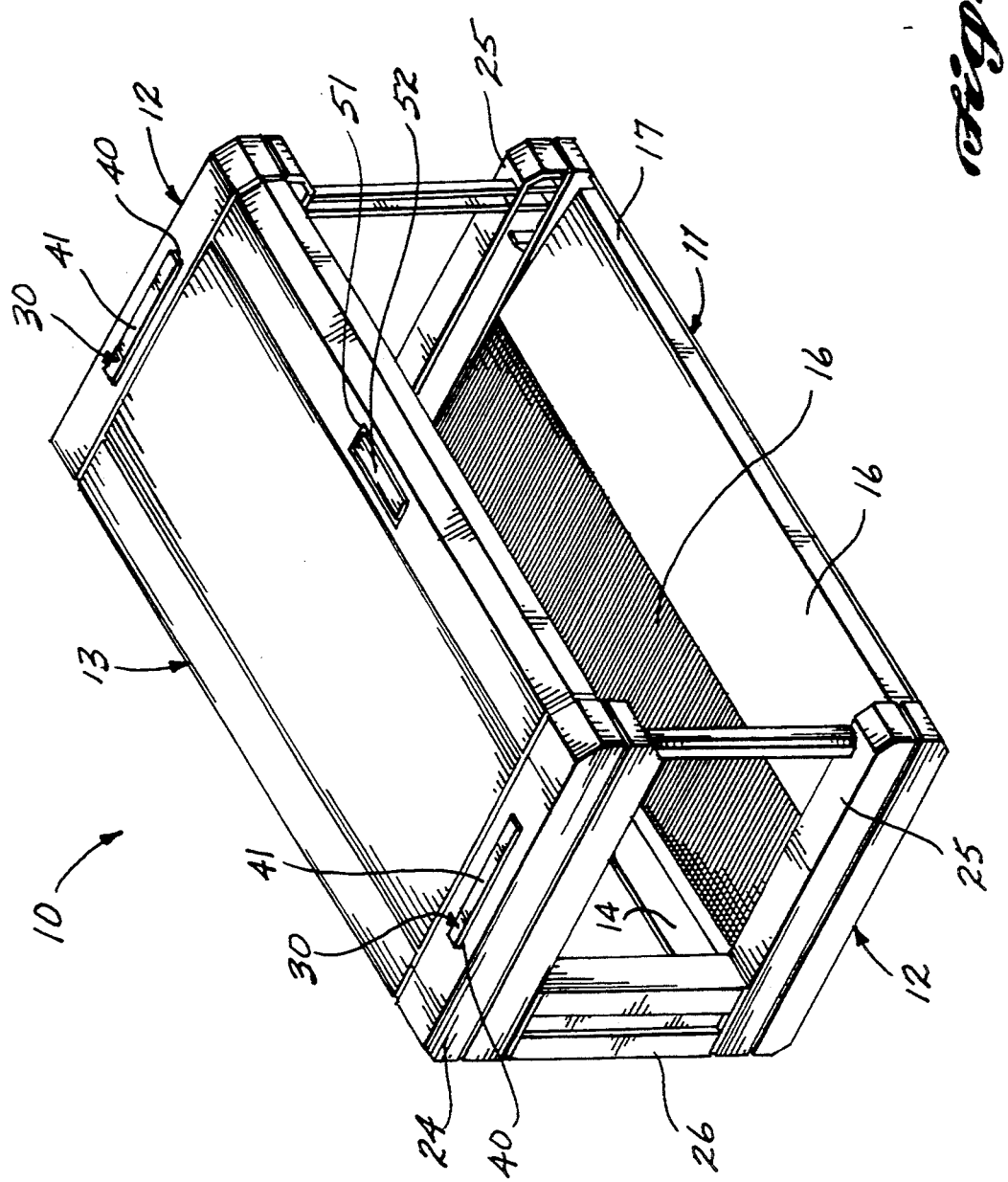
FIG. 1 is a perspective view of a storage apparatus according to the invention.

Referring now to the drawings, wherein similar numerals have been used to indicate like parts, there is shown therein a storage apparatus generally indicated at 10 according to the invention. The apparatus 10 will have particular, but not exclusive, use for the storage of "jewel boxes" in which compact discs are stored. The storage apparatus 10, as depicted in FIG. 1, comprises a base member 11, and two side members 12, a top member 13, and a retaining member 42 (FIG. 2) as will be described in more detail below.

Figure 2:
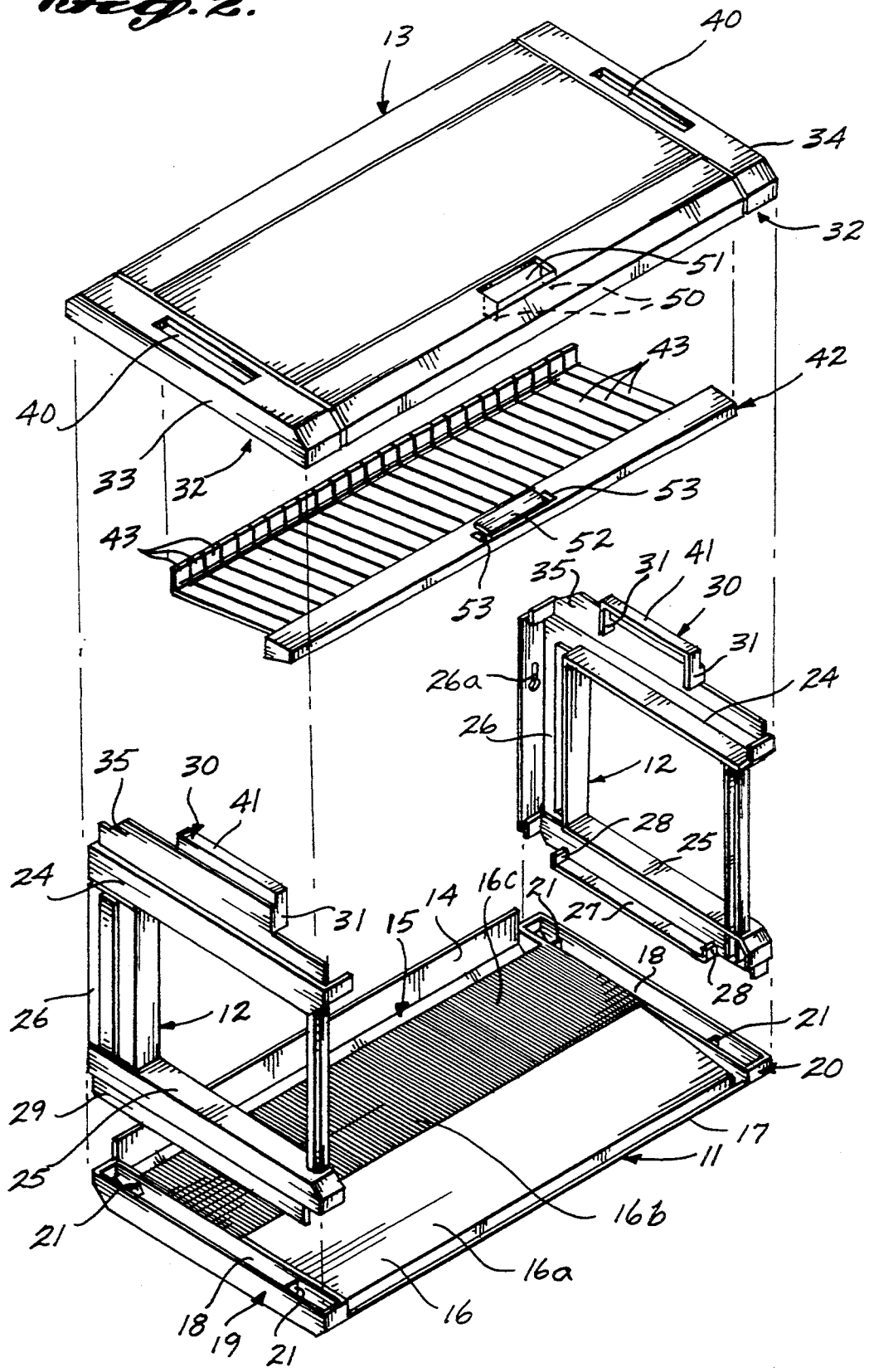
FIG. 2 is an exploded perspective view of the apparatus of FIG. 1.
Figure 3:
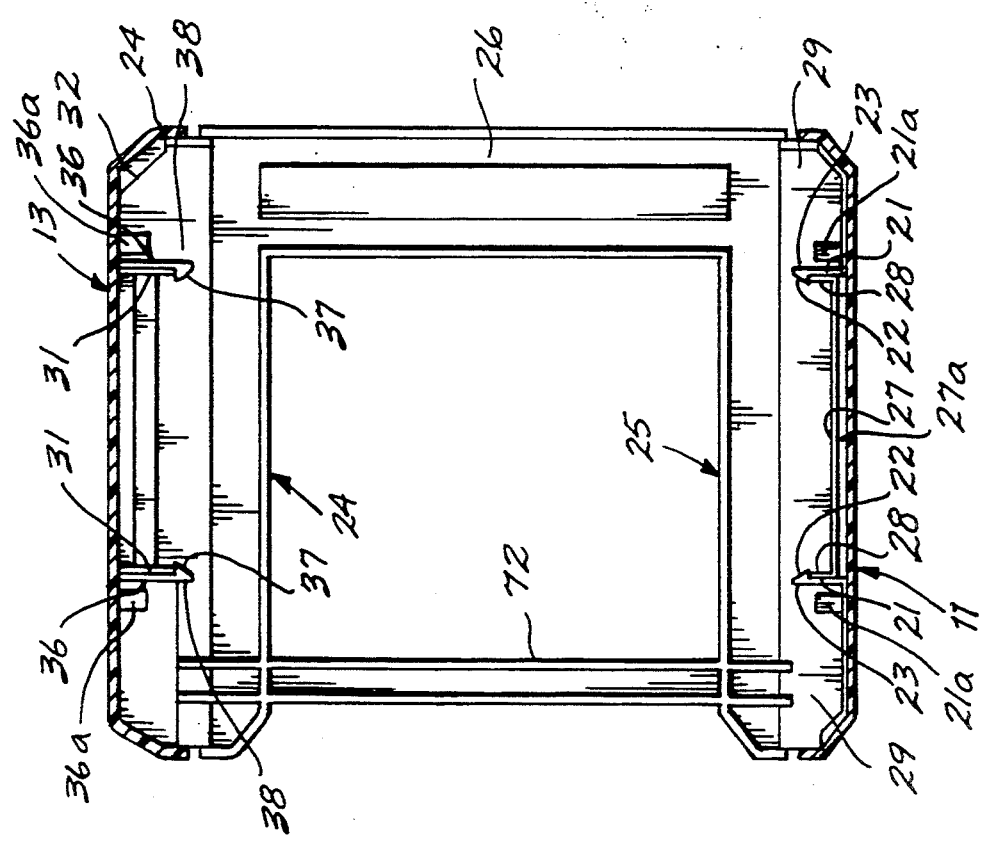
FIG. 3 is a sectional view through a side member of the apparatus of FIG. 1 taken along line 3—3.
Figure 7:
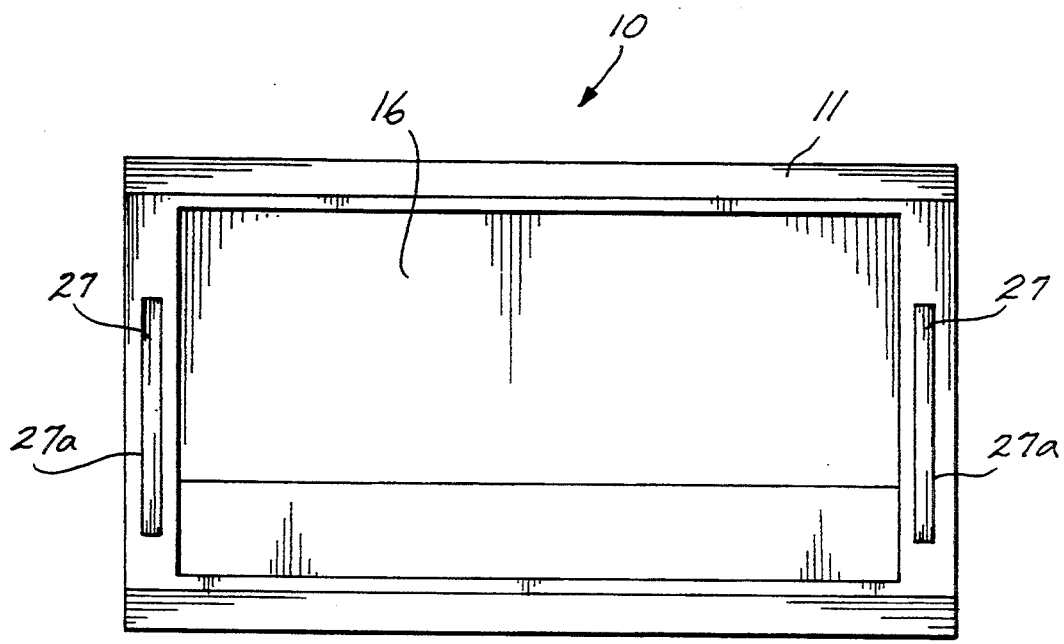
FIG. 7 is a bottom plan view of the apparatus of FIG. 1.
Figure 8:
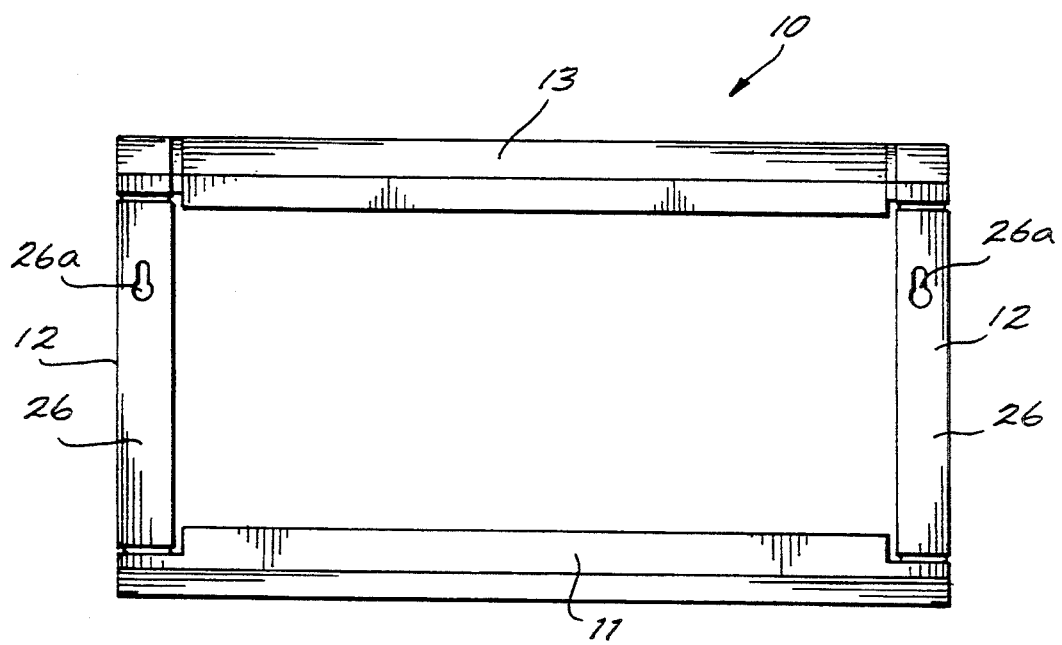
FIG. 8 is a rear plan view of the apparatus of FIG. 1.

The base member 11, as depicted in detail in FIGS. 2 and 7, comprises a plastic moulding having an upstanding flange 14 at its rear end 15. The base member 11 has a bottom plate 16 that serves as the surface on which the containers rest. The forward section 16a of the bottom plate 16 slopes downwardly towards the front edge 17 for about one-third of the width (front to rear) of the base member 11 as shown. The section 16b of the bottom plate, the section located in the rear of the apparatus 10 that is substantially horizontal, is formed with rectangular ridges 16c that extend from the front to the rear of the apparatus. The ridges 16c extend up above the surface less than 1/32 inch and are spaced so that there are at least two ridges per width of container of the storage containers the apparatus 10 is designed to hold. Base member 11 further includes a front edge, or lip, 17 that is V-shaped and extends first downwards and then upwards from the forward edge of the base plate front section 16a. As seen in FIGS. 2 and 3, an elongate recess 18 is defined by a pair of side pieces 19 and 20 and the base plate 16, wherein the side pieces are slightly spaced from the opposed edges of the base plate. A pair of integrally formed spaced-apart upstanding resilient lugs 21 are provided in each of the recesses 18, the lugs 21 each having a lip 22 at their upper ends 23 which face each other. In some preferred embodiments of the invention, a small tab 21a is located behind each lug 21. The tabs 21a serve to prevent the rearward movement of the lugs 21, to prevent the lugs from being inadvertently broken off.

Each side member 12, as shown in FIGS. 2, 6 and 8-10, comprises a plastic moulding including integrally formed top part 24, a bottom part 25, a first vertical part 26 located at the rear of the member and a second vertical part 72 located rearward of the front of the member. The bottom part 25 of the side members 12 each have a generally U-shaped flange 27 having vertical end parts 28. The side member 12 is formed so that the base, or center section, of the flange 27 is located slightly above the bottom edge of the bottom part 25 so as to create a recess 27a. The side wall 29 of the bottom part 25 is accommodated in the base member recess 18, and as it is located in place, the vertical end parts 28 of the flange 27 engage under the respective lip 22 of the resilient lugs 21. It will be understood that as the side member 12 is pushed vertically into the recess 18, the lugs 21 will be forced slightly further apart until the end parts 28 pass the lips 22 on the lugs 21 which then under their inherent resilience return to their normal position and thus engage with the end parts 28 to securely engage the side members 12 with the base 11. It will be understood that each of the side members 12 are engaged on the base member 11 in this manner. The back walls of the vertical parts 26 are provided with keyhole shaped openings 26a to facilitate the coupling of the storage apparatus 10 to fasteners, not shown, so that the storage apparatus can be wall mounted.

The top part 24 of each side member 12 also has a flange 30 of a generally inverted "U" shape with end parts 31. Flange 30 is dimensioned so that when the apparatus 10 is assembled, the flange will extend slightly above top member 13. Flange 30 is further dimensioned so that the portion of the flange that extends above top member 13 is sized to fit into the recess 27a in the bottom of the side member 12. This arrangement allows multiple storage apparatuses 10 of this invention to be interlocked when they are stacked one on top of another.

Figure 5:
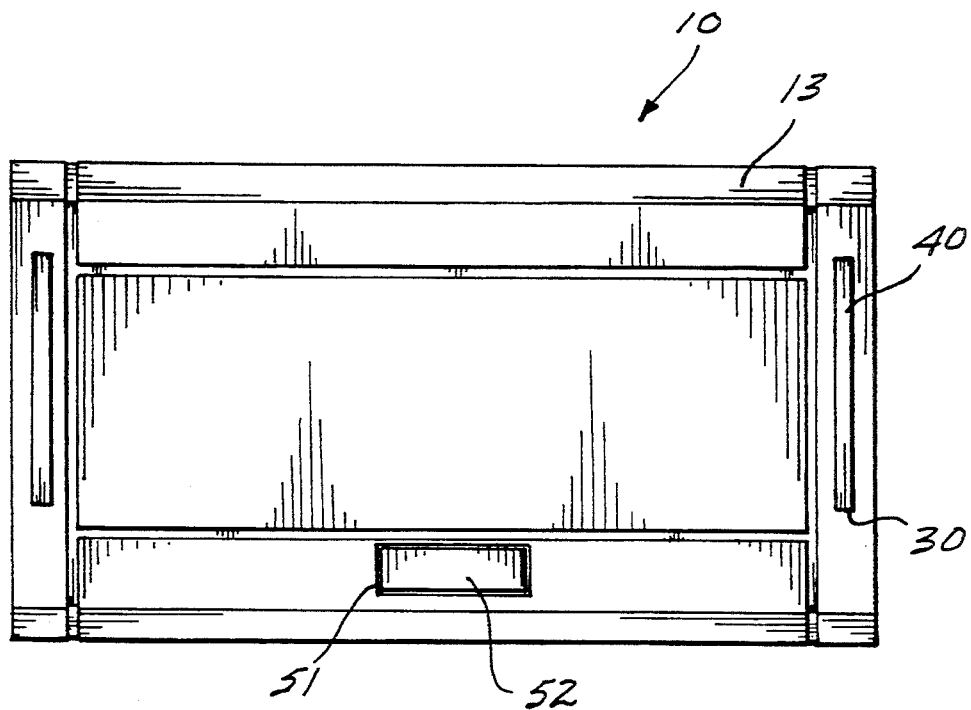
FIG. 5 is a top plan view of the apparatus of FIG. 1.
Figure 6:
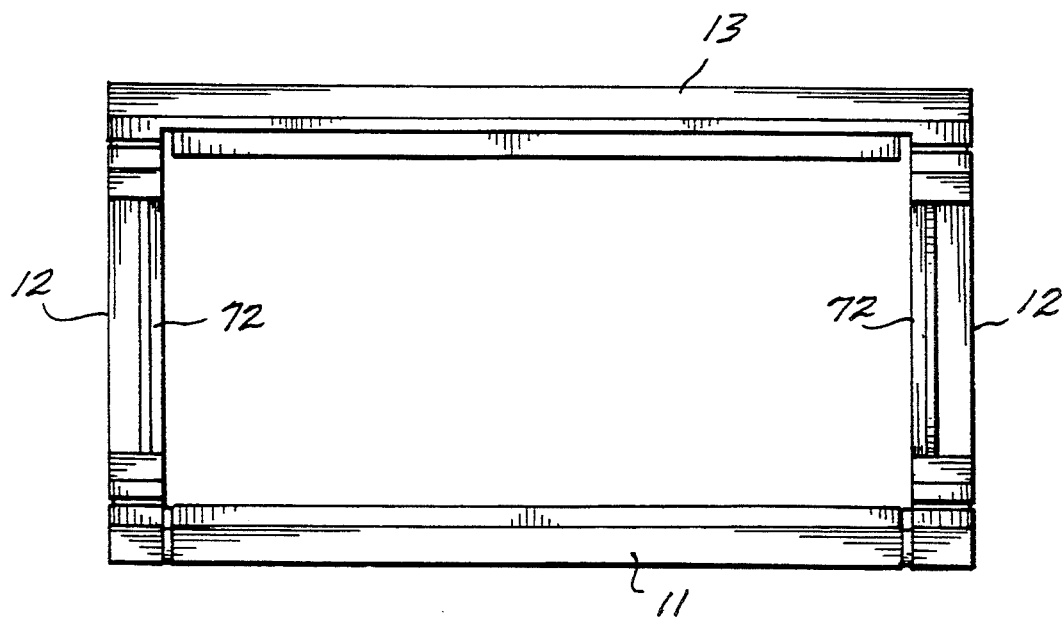
FIG. 6 is a front plan view of the apparatus of FIG. 1.

The top member 13, as depicted in FIGS. 2 and 5, is also formed of a plastic moulding and has a recess 32 adjacent each side 33 and 34 which serve to accommodate side walls 35 of the top part 24. Further, the top member 13 has in each recess 32 a pair of integrally formed spaced-apart depending resilient lugs 36, each lug 36 having a lip 37 at its lower end 38. Thus, to engage the top member 13 on the top parts 24 of the side members 12, the top member 13 is located so that the recesses 32 are disposed above the top parts 24 of the side members 12 and the top member 13 is then pushed downwardly so that the lips 37 of the lugs 36 engage under the end parts 31 of the flange 30. The top member 13 is then securely retained on the side members 12. Also, the top member 13 has an aperture 40 in its surface above the recesses 32, to accommodate the top 41 of the flanges 30. Top member 13 is also provided with small tabs 36a adjacent the lugs 36 which serve the same function with respect to lugs 36 that tabs 21a do with respect to lugs 21.

A retaining member 42 in the form of a plastic moulding having a plurality of resilient, linearly aligned, integrally formed fingers 43 arranged in parallel side-by-side relationship is mounted on the underside of the top member 13. Fingers 43 are laterally dimensioned and spaced apart so that each finger and associated inter-finger space is approximately equal to the lateral width of the containers that will be inserted in the storage apparatus 10. The retaining member may be secured in position in any suitable manner, but in the preferred arrangement a pair of spaced-apart downwardly depending lugs 50, similar to the lugs 36, are integrally formed on the underside of the top member 13, adjacent an aperture 51 also formed in the top member. The retaining member 42 has a raised boss 52 which in use is accommodated in the aperture 51, and on either side of the boss 52 there is provided a pair Of apertures 53 corresponding to the position of the lugs 50. On the underside of the retaining member 42, adjacent each of the apertures 53, there is provided a depending flange (not shown), which in use engages above a lip (not shown) on a respective one of the lugs 50, which project through the apertures 53. Thus, the retaining member 42 is secured in place in a manner similar to the top member 13 being secured to the side members 12.

Base member 11, side members 12 and top member 13 are further dimensioned so that they have a front-to-back width that is slightly less than the length of the containers the storage apparatus 10 is intended to hold. Thus when a container is placed in the storage apparatus 10, the front end of the container extends slightly forward of the front end of the storage apparatus. For example, the members used to form a storage apparatus 10 for holding compact disc "jewel boxes" 60 are dimensioned so that each jewel box extends approximately 0.25 inch out of the apparatus.

Figure 4:
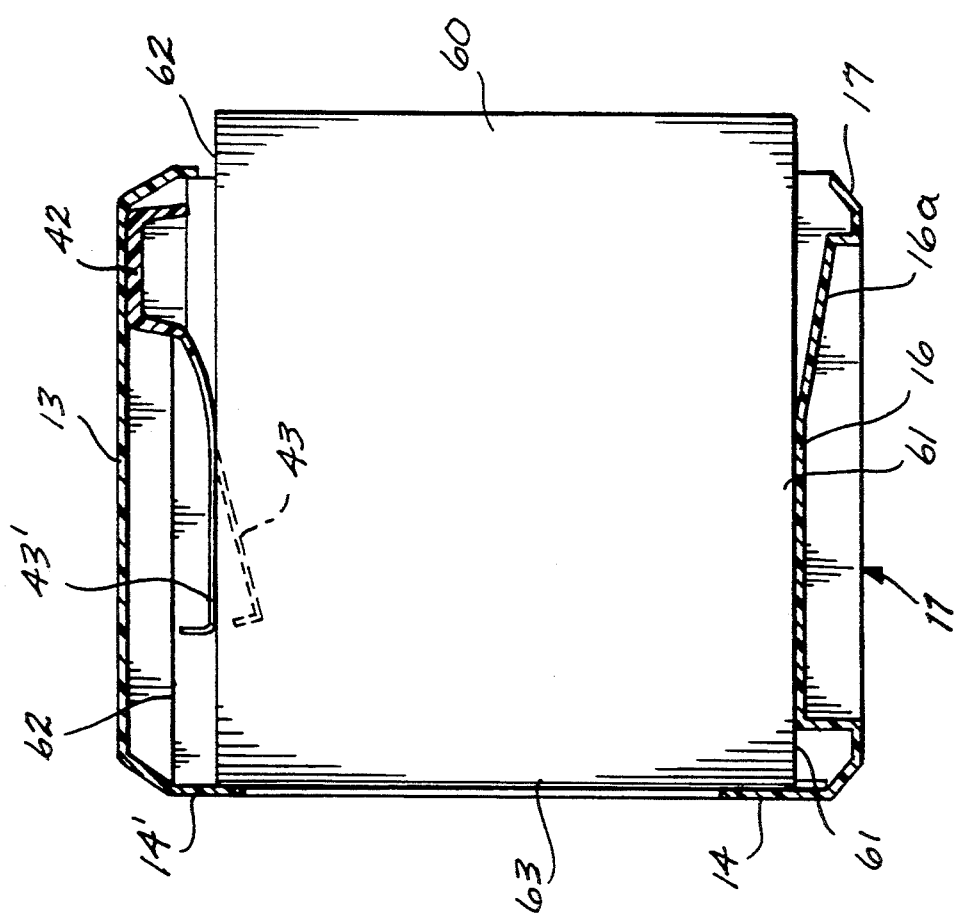
FIG. 4 is a cross-sectional view of the apparatus of FIG. 1 with a compact disc "jewel box" in a storage position taken along line 4—4.

A container, for example a jewel box 60 as shown in FIG. 4, is stored in the apparatus 10 by pushing the box into the apparatus from the front and as the lower edge 61 of the box 60 engages the surface 16 of the base member 11, the upper edge 62 of the box engages the downwardly sloping resilient fingers 43 which are urged upwards against their inherent resilience to a position indicated at 43'. When the cassette is properly located on the base member 11, the rear edge 63 of the box abuts the flange 14 on the base member 11 and also a finger 43 which extends downwards from the top member 13. The upper edge 62 of the cassette is held in place on either side by other adjoining boxes, or, when there are no boxes present the edges of the adjoining resilient fingers 43. The ridges 16c formed in the base plate 16 prevent the bottom surface of the jewel box 60 from sliding laterally. Thus, the jewel box 60 is securely retained between the base member 11 and the resilient finger 43, and can stand in a desired vertical position.

It will be appreciated that a plurality of cassettes may be held in the apparatus with each cassette being retained by a respective resilient finger 43. Thus, the fingers 43 will be of a width similar to or slightly less than the thickness of a cassette when removal of a jewel box 60 is desired, an individual simply has to press down on the upper corner of the box; the box will pivot downwards onto the base member forward section 16a so that it can readily be slid out of the storage apparatus 10.

The storage apparatus 10 of this invention can hold containers in a vertical, or upright, position without the aid of vertically oriented support members. The absence of vertical support members serves to maximize the storage capacity of this apparatus 10 since none of the space therein is occupied by any support members; all the space can be used to hold containers. Moreover, since the storage apparatus 10 does not include vertical support members, the location of multiple containers can be repositioned inside the apparatus by simply removing the containers together partially out of the apparatus and then reinserting them in the new location. This makes it possible to interleave new containers into the apparatus without having to move the previously stored containers on a one-by-one basis. Still another advantage of the storage apparatus 10 of this invention is that since there are no vertical support members, and the retaining fingers 43 are concealed from view, all the eye sees are the jewel boxes 60; this provides the apparatus with an aesthetically pleasing appearance.

Figure 11:
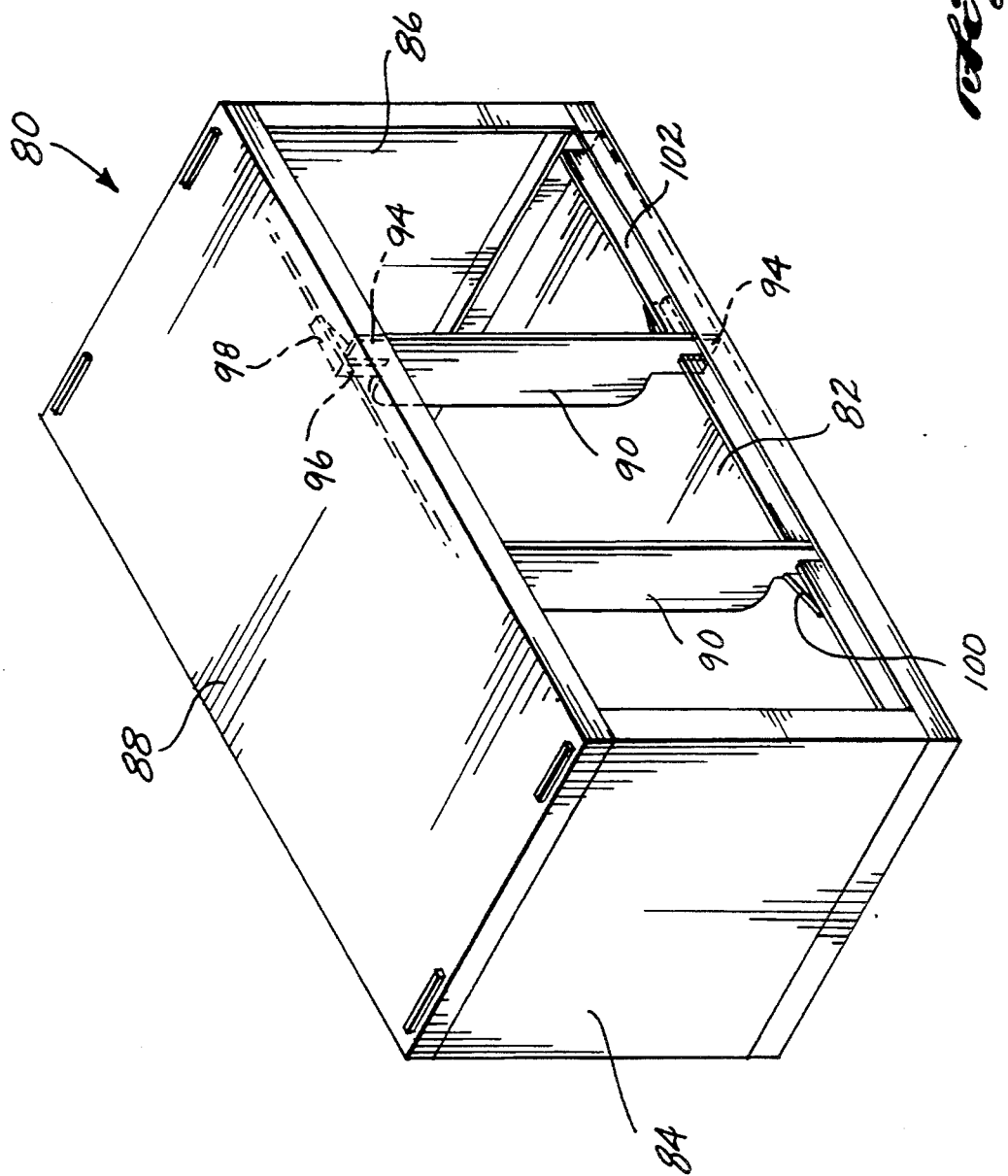
FIG. 11 is a perspective view of an alternative storage apparatus of this invention.

FIG. 11 is a perspective view of an alterative storage apparatus 80. Storage apparatus 80 includes a base plate 82, two side sections 84 and 86, and a top plate 88. Storage apparatus 80 further includes a pair of stop panels 90 that extend between the base plate 82 and top plate 88 that serve to keep jewel boxes 60 stored in the apparatus in place. The side sections 84 and 86 are fixed in place and extend between adjacent lateral edges of the base plate 82 and the top plate 88. Stop panels 90 can be adustably positioned along the lateral, or side-to-side, axis of the storage apparatus 92 so that the jewel boxes 62 can be placed in any location inside the apparatus the user finds desirable.

Each stop panel 90 is generally in the form of a flat, elongated member. Each stop panel 90 is formed with a pair of spaced-apart legs 94 and 96 at each end of the member. Legs 94 are generally flat extensions of the basic stop panel 90. Legs 96 are line legs 94, and are further provided with feet 98 that extend perpendicularly outward from their outer edges. In the illustrated embodiment of the invention, the stop panels 90 are further formed with reinforcing flanges 100 that extend between legs 96 and feet 98.

The stop panels 90 are compression fitted between the apparatus base plate 82 and the top plate 88. The base plate 82 and the top plate 88 are provided with coplanar rails 102 that extend toward each other. When the stop panels 90 are secured in place, the legs 94 and 96 are positioned around the rails 102 so as to provide stability along the lateral axes of the panels. The panel feet 98, which abut the adjacent plates 82 and 88, prevent the stop panels from pivoting.

Containers, such as compact disc jewel boxes, can be held for storage in the apparatus 80. The stop panels 90 prevent the containers from falling over when the apparatus 80 is only partially full. The containers can be removed and reinserted from the apparatus together so as to facilitate the interleaving of new containers in with containers that have been previously stored.

The foregoing description has been limited to specific embodiments of the invention. It will be apparent, however, that variations and modifications can be made to the invention with the attainment of some or all of the advantages. For example, while the described embodiment of the invention is used to hold compact disc storage boxes, it is clear that other versions of the invention can be provided to hold things like audio tape cassettes or videotape cassettes. Moreover, other versions of the invention need not have the exact type of retaining member that has been described. Other versions of the invention may include a retaining member with retaining elements that are actually spring biased so as to exert a compressive force on the containers they are intended to hold in place. Some versions of the invention may not even have a master retaining member; the retaining elements may each be individually attached to the top member. Furthermore, in still other versions of the invention it may be desirable to provide the retaining members with the base member. In these versions of the invention it would still be possible to provide the base member with the downwardly sloping forward section. Alternatively, the top member could be provided with a sloping section so as to facilitate removal of articles from the storage apparatus.

Therefore, it is the object of the appended claims to cover all such variations as come within the true spirit and scope of the invention.

The embodiments of the invention in which an exclusive property or privilege is claimed are defined as follows:

1. A storage device for holding articles, said storage device comprising:
   a bottom member having a front edge, a rear edge, and a main surface and a forward surface between said edges, rearward portions of the articles resting only on said main surface when held by the storage device, wherein said bottom member forward surface forms an acute angle with a horizontal plane defined by said main surface;
   at least two side walls that extend upwardly from said bottom member;
   a top member attached to said side walls and positioned opposite said bottom member and having a front edge and a rear edge; and
   a set of aligned, spaced-apart, retaining fingers attached to said top member, each of which is arranged in a front-to-rear orientation across said top member said fingers being upwardly movable, said fingers providing stability to the articles when held vertically in said storage device, each of said retaining fingers flexing away from adjacent retaining fingers when one of the articles is placed beneath it so that the container is secured in place between said adjacent retaining fingers.

2. The storage device of claim 1, wherein said retaining fingers are attached to a common retaining member attached to said top member.

3. The storage device of claim 2, wherein said fingers extend from adjacent said top member front edge toward said top member rear edge.

4. The storage device of claim 1, wherein said bottom member forward surface is a smooth surface and said bottom member main surface is formed with ridges that extend front to rear across said surface, said ridges being arranged and configured to not project between adjacent articles when the articles are in said storage device.

5. The storage device of claim 1, wherein said bottom member is formed with a stop rib that extends along said bottom member rear edge.

6. A storage device for holding a plurality of substantially equally sized objects, said storage device comprising:
- a plurality of individual object storage containers having predetermined height, length, and width;
- a bottom member having a front edge and a rear edge and a main surface between said edges on which the storage containers rest and wherein the width of said main surface is less than the length of the storage containers so that the storage containers extend forward of the main surface;
- at least two sidewalls that extend upward from said bottom member;
- a top member attached to said sidewalls and spaced above said bottom member having a front edge and a rear edge wherein said top member is dimensioned to have a front-to-rear width less than the length of the storage containers; and
- a set of aligned, spaced-apart, biased retaining elements attached to said top member, each of which is arranged in a front-to-rear orientation across said top member and is dimensioned to have a combined element and interelement width substantially equal to the width of a storage container and is positioned to have a vertical separation between said retaining elements and said bottom member less than the height of the storage containers so that, when a storage container is inserted between one of said retaining elements and said bottom member, said one retaining element flexes away from adjacent retaining elements so that the container is secured in place between said adjacent retaining elements.

7. The storage device of claim 6, wherein said retaining elements are attached to a common retaining member attached to said top member.

8. The storage device of claim 7, wherein said retaining member extends approximately between said sidewalls and is adjacent said top member front edge and said retaining elements are flexible fingers that extend from said retaining member toward said top member rear edge.

9. The storage device of claim 6, wherein said bottom member main surface extends from a point approximately halfway between said bottom member front edge and said bottom member rear edge toward said bottom member rear edge, and said bottom member is further provided with a front surface that extends downwardly from said main surface toward said bottom member front edge.

10. The storage device of claim 8, wherein said bottom member main surface extends from a point approximately halfway between said bottom member front edge and said bottom member rear edge toward said bottom member rear edge, and said bottom member is further provided with a front surface that extends downwardly from said main surface toward said bottom member front edge.

11. The storage device of claim 9, wherein said bottom member front surface is a smooth surface and said bottom member main surface is formed with ridges that extend front to rear across said surface, the interridge width being less than the width of the storage containers.

12. The storage device of claim 6, wherein said bottom member is formed with a stop rib that extends along said bottom member rear edge.

* * * * *